May 21, 1963 H. C. HANSEN 3,090,625

PHONOGRAPHIC APPARATUSES

Filed Feb. 8, 1960 2 Sheets-Sheet 1

INVENTOR.
HANS CHRISTIAN HANSEN
BY Dicke, Craig + Freudenberg
ATTORNEYS

May 21, 1963 H. C. HANSEN 3,090,625

PHONOGRAPHIC APPARATUSES

Filed Feb. 8, 1960 2 Sheets-Sheet 2

INVENTOR.
HANS CHRISTIAN HANSEN

BY Dicke, Craig + Freudenberg
ATTORNEYS

United States Patent Office
3,090,625
Patented May 21, 1963

3,090,625

PHONOGRAPHIC APPARATUSES

Hans Christian Hansen, 14 Christiansholmsvej, Klampenborg, Denmark

Filed Feb. 8, 1960, Ser. No. 7,351
Claims priority, application Great Britain Feb. 9, 1959
20 Claims. (Cl. 274—15)

The present invention relates to improvements in phonographic apparatuses.

It is the main purpose of the invention to provide a phonograph having a simplified mechanism for raising the tone arm which enables the tone arm to remain raised when swung in horizontal direction.

It is a further purpose of the invention to provide a phonograph having a simple and reliable mechanism for raising the tone arm and swinging it outwards to an inoperative position after playing of a record.

It is a further purpose of the invention to provide a phonograph having a member reciprocating in response to termination of the playing of a record which causes raising of the tone arm in response to such reciprocation.

It is a further purpose of the invention to provide a phonograph having a tiltable member for causing the tone arm to be raised when said member is tilted in one direction, and in which the tilting of said member to raise the tone arm is caused by reciprocation of a member actuated after playing of a record.

It is a further purpose of the invention to provide a phonograph having a trigger mechanism operable after playing of a record, and means operable by a reciprocating member of said trigger mechanism to cause the tone arm to be raised.

It is a further purpose of the invention to provide a phonograph having a tiltable member operable to control raising of the tone arm in which the tiltable member also swings with the tone arm, and the tone arm can be retained in raised position when swung in horizontal direction.

Still a further purpose of the invention is to provide a phonograph having means for facilitating depositing the tone arm on the surface of a record.

Still a further purpose of the invention is to provide a phonograph having means for facilitating the manual operation when the tone arm is to be deposited on the surface of a record including semi-automatic means for lowering the tone arm with its stylus in engagement with the initial sound groove of the record.

Figure 2:
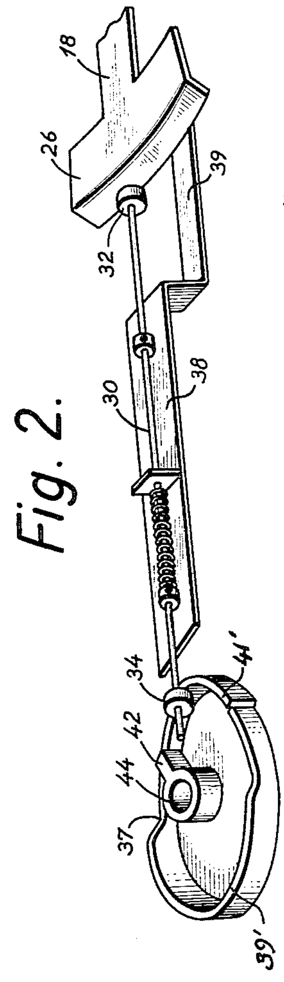
Figure 1:
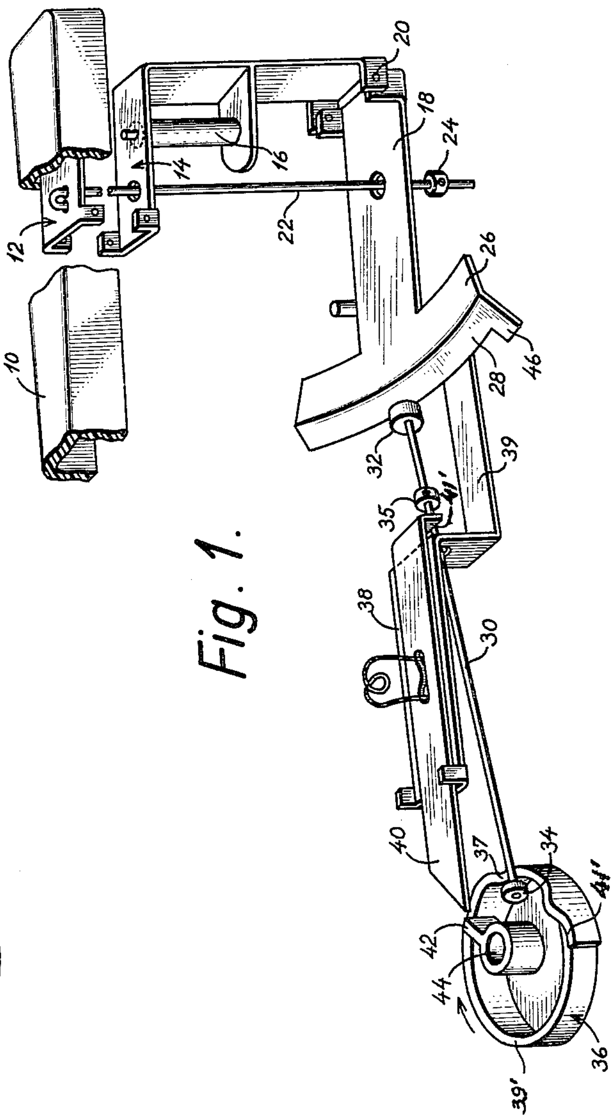
Figure 3:
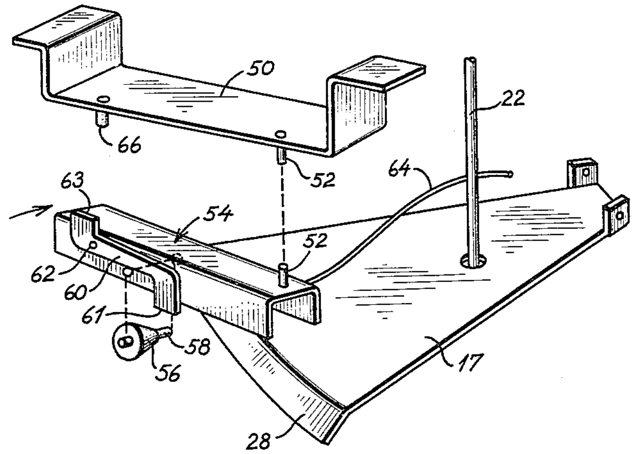
Figure 4:
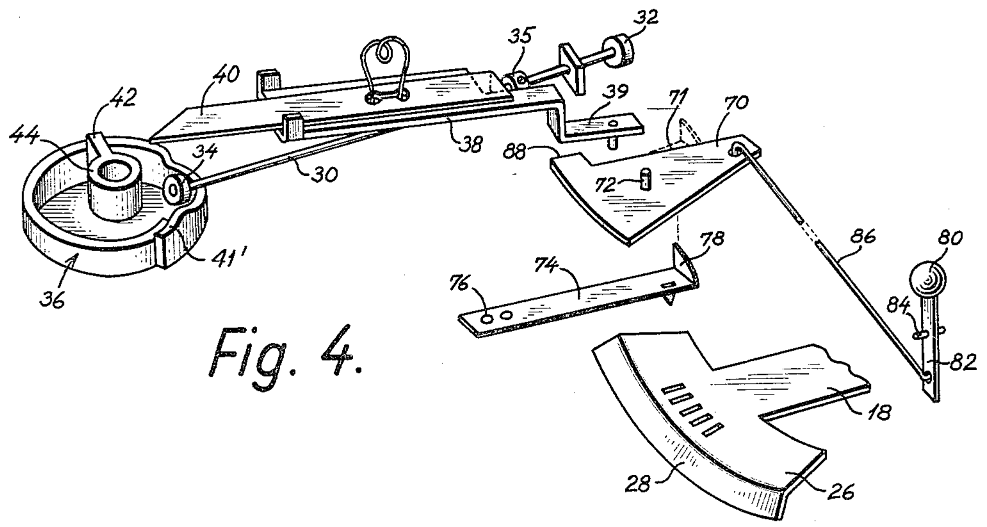

The invention will be further described with reference to the accompanying drawings, in which:

FIGURE 1 is a perspective view of the essential parts of the phonograph according to the invention, in one embodiment, FIGURE 2 is a perspective view of a modified embodiment, FIGURE 3 is a perspective view of details of the phonograph in another embodiment, and FIGURE 4 is a simplified perspective exploded view of the parts of the phonograph illustrating the manual control arrangement.

In the drawings only the movable parts of the phonograph are illustrated. The unit plate, the turntable and the driving arrangement therefor are not shown. For the sake of completeness cross reference is made to my U.S. Patent 2,891,409 and the corresponding Great Britain Patent 757,378 relating to turntable driving arrangement, the disclosures of said patents hereby being made part of the disclosure of this application.

Now with reference to the drawing the invention provides in broad terms a phonograph having a tone arm 10 and a mechanism for raising the tone arm including an arm 18. The arm 18 is connected with the tone arm so as to swing together therewith. In other words, if the arm 18 is caused to swing, the tone arm will swing therewith and alternatively, if the tone arm is swung by hand, the arm 18 is swung with the tone arm.

The arm 18 is mounted for tilting movement perpendicular to the direction in which it swings, and by means of a suitable transmission, such as a control rod 22, the tilting of the arm 18 in one direction, more specifically according to the embodiments illustrated, in downward direction, the tone arm will be raised.

Furthermore the arm 18 has an extending portion 26 which extends in transverse direction of the arm.

The tilting of the arm 18 to raise the tone arm is effectuated by suitable means engaging with the top side of the arm 18. Such means may be in the form of an abutment which is brought into position under manual control or automatically. The sidewardly directed extension 26 of the arm 18 has such an extension adapted to the angle through which the tone arm can be swung from its interior position after playing of a record to an exterior position outside the periphery of a record that the abutment which causes the arm 18 to be tilted downwardly still will be in engagement with the extension 26 during the swinging of the tone arm from its interior to its exterior position, or vice versa.

In order to provide manual control of the phonograph such as for example to facilitate the depositing of the tone arm with its stylus in engagement with a record and a predetermined point of the sound groove, such as for example in the initial sound groove of records of different sizes, a manual control member 80 (FIG. 4) can be provided which, when actuated through suitable members to be more fully described in the following, causes the arm 18 to be tilted in downward direction. Hereby the tone arm can be raised, for example from a lowered position outside the periphery of the turntable where the tone arm rests on a post including a switch control member. By raising the tone arm the phonograph switch will be closed whereby the turntable starts to rotate. Due to the sideward extension 26 of the arm 18, the tone arm can then be swung in by hand until its stylus tip is above the sound groove of the record. In this position a manipulation of the control member 80 can be caused to release the tilting of the arm 18 and thereby lower the tone arm on the record. In other words, this provides a semi-automatic mechanism for depositing the tone arm on a record.

As will be appreciated, raising of the tone arm can also be caused automatically by bringing a suitable abutment to engage the top side of the arm 18, 26 to tilt it downwardly. Such abutment may be a member associated with or controlled by a trigger mechanism operable after playing of a record so as to raise the tone arm to disengage the stylus from the surface of a record when its playing has been terminated.

Such lifting of the tone arm after playing of a record does not need to be combined with an automatic outward movement of the tone arm within the scope of my invention. I prefer, however, to provide such automatic movement because the specific tone arm raising mechanism according to my invention enables the structure of a simplified control mechanism for moving the tone arm, i.e. in the form of an elongated shaft 30 which either forms a part of the trigger mechanism or is reciprocated in response to the operation of the trigger mechanism. The abutment which raises the tone arm by tilting the arm 18 downwardly is in the form of a roller 32 at one end of the shaft 30, which is reciprocated in response to the operation of the trigger mechanism. A second roller 34 is provided at the other end of the arm 30 and comes in response to the reciprocation in engagement with a driving member which rotates the spindle 30 so that the rotation of the roller 32 as a result of its frictional engagement with the top surface of the arm structure 18, 26 moves the tone arm to its exterior position where the tone arm, for example can be lowered on the switch control member. The spindle 30 is latched in reciprocated position and unlatched to disengage the driving connection when the tone arm is in its desired exterior position.

With more specific reference to the drawings the phonograph according to the invention has a tone arm structure including a tone arm 10 which by means of a bracket 12 is supported to be raised and lowered in vertical direction on a bracket structure 14 supported to swing in horizontal plane on a spindle 16. Adjacent the lower end of the bracket structure 14 and arm 18 is tiltably supported at 20 and designed to control raising and lowering of the tone arm by means of a control rod 22 which at its top end engages with the tone arm bracket 12 behind its pivot connection with the bracket structure 14 so as to lift the tone arm when the rod 22 is pulled down.

The rod 22 extends down through a hole in the arm 18 and is below the arm provided with an adjustable abutment 24 which is engaged by the arm 18 when the latter is tilted with its front end swung downwardly so as to thereby lift the tone arm. In the embodiment shown in FIGURE 1 the front end of the arm 18 has a transverse extension 26, the front edge of which is in the form of a sloping portion 28.

The extension 26 of the arm 18 is of such a length that, when in order to raise the tone arm the arm 18 is tilted in the direction of the arrow shown by means of a member engaging the top side of the arm 18, the arm can swing through its entire stroke with the extension 26 still in engagement with the member in question, i.e. the extension 26 is of such a length that when the tone arm is raised, the member causing the raising is capable of keeping the tone arm raised during its entire horizontal movement from an exterior position to a position after playing of a record, or vice versa, when the tone arm is raised after playing of a record it can be retained in raised position by the engagement of the member which has caused the raising and the surface of the extension 26 to the exterior position of the tone arm.

This provides for use of a simplified control mechanism to raise the tone arm, and, if desired, also to move the tone arm or alternatively for simple manual control to facilitate depositing the tone arm stylus in the initial sound groove of a record or elsewhere to engage the sound groove of a record to terminate playing of a desired passage of the record.

In the embodiment shown with reference to FIGURE 1 the means for raising the tone arm is in the form of a member 30 mounted for reciprocation after playing of a record, and having a member 32 thereby engaging the inclined portion 28 of the arm 18, 26 so as to swing the arm 18 downwardly in the direction of the arrow shown in response to the reciprocation of the member 30 and thereby raise the tone arm.

According to a more specific aspect of the invention the member 30 is in the form of an elongated shaft mounted for rotation and having a driven member 34 adapted to be brought into a driving position engaging a driving member 36 when the shaft 30 is reciprocated. According to this aspect the member 32 is further in the form of a driving wheel or roller capable of swinging the arm 18 when it is in engagement with the top surface of the arm portion 26 so as to thereby cause the tone arm to be swung outwards.

The member 30 is according to the embodiment shown in FIGURE 1 associated with a trigger mechanism comprising two arms 38 and 40 of which the arm 38 is mounted for swinging movement and of which the arm 40 is mounted for swinging movement together with the arm 38 as well as for reciprocating movement by engagement between the front end of the arm 40 and a rotating nose 42 on the turntable spindle 44. Such mechanism is known in various embodiments. The embodiment here illustrated is according to my British patent specification No. 801,176 and the corresponding U.S. patent application No. 491,422 the disclosure of which is hereby made part of the present disclosure, but it will be understood that the invention is not limited to the use of a trigger mechanism of this specific design.

During the last part of playing of a record an abutment 46, which extends below the arm portion 28 engages an extension 39 of the arm 38 so as to thereby swing the trigger members inwardly. When the front end of the arm 40 is engaged by the rotating nose 42, the arm 40 is reciprocated whereby an abutment 41 adjacent the rear end engages an abutment 35 on the shaft 30 whereby the shaft is reciprocated to a position first causing the tone arm to be lifted by downward swinging of the front end of the arm 18 due to engagement between the roller 32 and the inclined portion 28. Hereafter the roller 32 comes into engagement with the top surface of the extension 26 of the arm 18.

During the reciprocation the roller 34 is brought into engagement with the driving member 36 which is in the form of a cam portion of a member associated with the turntable, for example a part of the turntable spindle structure. By the rotation of the turntable this cam portion engages the roller 34 and thereby causes rotation of the shaft 30 so as to cause the driving roller 32 at the other end of the shaft to swing the tone arm outwardly in raised position.

More specifically the cam 36 has a portion 37 in such a position relatively to the nose 42 of the turntable spindle and in such a plane that the roller 34 can pass above the surface of the came portion 37 when the shaft 30 is reciprocated. The cam portion 37 continues in an elevated cam portion 39′ which engages the roller 34 to rotate the spindle 30 so as to thereby swing the tone arm outwards. When the turntable has made one complete revolution, a cam portion 41′, which extends above the surface of the cam portion 39′ and which has an inwardly leading surface, comes into engagement with the roller 34 and releases the mechanism by causing the shaft 30 to be reciprocated in the opposite direction of that as caused by the action of the trigger mechanism and hereby the tone arm is lowered.

The arrangement described can for example be used in a phonograph to lift the tone arm after playing of a record and swing it out to a position outside the periphery of the turntable to be lowered on an actuating member for a switch opening the circuit for the phonograph motor.

Though the mode of operation of the structure illustrated in FIGURE 1 is believed to be clear from the foregoing description, the cooperation of the parts will be described in the following.

During the playing of a record the record is supported on the turntable, not shown, and the tone arm is lowered with its stylus in engagement with the top side of the record, the stylus following the sound groove therein. In this position the arm 18 is retained in a substantially horizontal plane or in another suitable predetermined plane, for example by means of a spring (not shown) interposed between the top side of the arm 18 and some other member of this tone arm structure, for example the vertical portion of the bracket 14. A suitable abutment which may extend from this vertical bracket portion limits the upward movement of the arm 18. In this plane the arm 18 is disengaged from the abutment 24 on the rod 22.

When after playing of the record the tone arm stylus enters the outlet groove of the record and thereby causes the tone arm to swing towards the centre of the turntable with increased velocity, the tip of the trigger arm 40 will during the next rotation of the turntable be engaged by the nose 42 on the turntable spindle so as to cause the arm 40 to reciprocate in the manner more fully described in my U.K. Patent 801,176 referred to hereinabove. By this reciprocation the flap 41 adjacent the end of the trigger arm 40 will engage the abutment 35 on the elongated shaft or spindle 30 and cause the spindle to participate in the reciprocation of the arm 40. Hereby the right hand end of the spindle 30 with the roller 32 will engage the inclined cam surface 28 adjacent the front end of the arm structure 18, 26 and tilt the arm 18 downwards about its pivot 20 so as to engage the abutment 24 on the rod 22 and thereby raise the tone arm by tilting the tone arm bracket 12 about its pivot on the front end of the horizontal portion of the bracket 14. It will be understood that instead of having an inclined portion 28 adjacent the front end of the arm 18, 26, the roller 32 may have a conical front end to provide for the cam action causing the downward tilting of the arm 18.

By the reciprocation of the shaft 30, its roller 34 further is moved to the orbit of the cam 36. During the next revolution of the turntable the cam surface 39′ by means of its engagement with the roller 34 causes the shaft 30 to rotate and by the frictional engagement between the roller 32 and the top side of the portion 26 on the arm the arm is swung outwards, retained in the tilted position, whereby the tone arm is swung outwards. The shaft 30 is latched in its reciprocated operative position. The latch means may for example be in the form of a groove in the surface of the cam 39′ adapted to receive the roller 34. When the cam portion 41′ comes into engagement with the right hand side of the roller 34, the shaft 30 will be unlatched and returned to its inoperative position, whereby the tilting of the arm structure 18, 26 is released and the tone arm is lowered, for example on a post including an actuating member for the phonograph motor switch so as to switch off the drive of the turntable.

The arrangement shown in FIGURE 2 differs from that shown in FIGURE 1 therein that the shaft 30 is made part of the trigger mechanism to replace the lever 40 thereof according to the embodiment shown in FIGURE 1.

The mode of operation of the modified arrangement illustrated in FIGURE 2 is believed to be clearly understandable from the foregoing description of the mode of operation of the arrangement according to FIGURE 1.

FIGURE 3 illustrates a further modification and is showing only the parts associated with the lower end of the tone arm structure.

In this embodiment the arm structure 18, 26 according to FIGURE 1 is in the form of a triangular plate 17. Above the plate 17 a member 50 in the form of a bridge is supported and carries on a pin 52 a structure generally referred to by reference numeral 54 which can swing in a horizontal plane above the surface of the plate 17. The structure 54 comprises a roller 56 rotatably supported on a pin 58 and extending below the underside of the structure 54 which is in the form of a plate bent as an inverted U. On the front side of the structure 54 a pawl 60 is tiltably supported on a pin 62. The pawl is so arranged that it has a downwardly bent front portion, the lower edge 61 of which is in a plane between the lowest point of the roller 56 and the lower edge of the structure 54 when the pawl is in position of rest engaging the pin 58. In the same position the top edge 63 of an upwardly extending end of the pawl extends above the top surface of the structure 54. The bridge further carries a resilient member, such as a wire spring 64. During playing of a record the structure 54 assumes a neutral position with the roller 56 outside the front edge of the plate 17 and with the front surface of the structure engaging a stationary pin 66 on the bridge 50. The structure is in this position so close to the under-surface of the bridge 50 that the pawl is swung slightly counter-clockwise due to engagement between the surface 63 of the pawl and the under-surface of the bridge.

When playing of a record is terminated, and for example causes the trigger mechanism to be actuated the reciprocable member of the trigger engages the structure 54 and causes it to swing in the direction of the arrow shown in FIGURE 3 about the pin 52. Thereby the roller 56, which is of conical configuration, engages the front edge of the plate 17 and causes the plate to tilt so as to thereby raise the tone arm in the same manner as described in connection with the operation of the roller 32 which raises the tone arm by its engagement with the inclined surface 28.

The structure 54 is swung so much that the spring 64 is tightened by engagement with the pin 22. When the edge 63 of the pawl passes behind the edge of the bridge 50 it will snap upwards and thereby latch the structure 54 in the position to which it has been swung. Since the spring 54 has been tightened it will exert an outwardly directed pressure on the rod 22 which will cause the entire tone arm structure to swing outwards with the surface of the triangular plate 17 in engagement with the roller 56 which constitutes a light friction member. When the rear edge of the triangular plate 17 passes the roller, the plate 17 will tilt upwardly to lower the tone arm, for example on its switch actuation member. By this lowering the top surface of the plate 17 will engage the edge 61 of the pawl so as to swing the pawl in counterclockwise direction whereby it will be unlatched from the rear edge of the bridge 50. Hereby an auxiliary spring (not shown) will swing the entire structure 54 counterclockwise until it comes into engagement with the pin 66.

More specifically the cooperation of the parts illustrated in FIGURE 3 is as follows:

When the arm 54 is in its inoperative position in engagement with the pin 66, the arm 17 can swing freely under the arm 54 without engagement with the roller 56. The arm 17 can also swing freely inwards to the end-of-play position after playing of a record without engaging the pin 22 with the spring 64.

When, however, after playing of the record the trigger mechanism, which is not illustrated in FIGURE 3, is actuated and the arm 54 is swung in the direction of the arrow as shown, the arm 17, by engagement with the roller 56, is tilted to raise the tone arm and the swinging of the arm 54 also brings the spring 64 into engagement with the rod 22.

When the arm 54 is swung so much that the portion 63 of the latch bar 60 passes behind the bridge 50 the latch bar 60 swings downward, because its pivot 62 is adjacent the left hand end of the latch bar. Hereby the portion 63 of the latch bar comes into engagement with the rear edge of the bridge 50 and retains the whole arm 54 in its swung position with the tensioned spring 64 in engagement with the rod 22. The tension of the spring hereby causes the tone arm to move outwards, the roller 56 acting as a light-friction member in engagement with the top surface of the arm 17.

As will be appreciated, the top surface of the arm 17 will come into engagement with the right hand portion 61 of the latch arm, when the roller 56 has passed the rear edge of the arm 17, or rather when the arm 17 during its outward movement has passed beyond the roller 56. Thereby the latch arm 60 will be swung counterclockwise to release the latch portion 63 from its engagement with the bridge and a spring (not shown) will then cause the arm structure 54 to swing in the opposite direction of the arrow shown into engagement with the pin 66.

In the foregoing raising of the tone arm by means of the structure illustrated and a control member actuated automatically after termination of the playing of a record has been described.

It is possible, however, within the scope of the invention to utilize the tone arm structure with the extended transverse portion 26 for the purpose of rejecting a record under manual control, or for the purpose of enabling the tone arm to be moved inwardly in raised position to the position in which it is to be deposited in the initial sound groove of the record. Such an arrangement is illustrated schematically in FIGURE 4.

According to this embodiment an arm 70 is swingingly arranged about a pin 72 below the surface of the phonograph chassis plate (not shown). Below the arm 70 a leaf spring 74 is at one end at 76 secured to the underside of the phonograph chassis. The free end of the spring 76 has an upwardly bent extension with an inclined edge 78. An actuation member, such as a knob 80, is supported on a lever 82 tiltable in a horizontal plane about a point 84 and being at its lower end connected with one end of the plate 70 by means of a rod 86.

The parts described are so mutually located that when the lever 82 is in a substantially vertical position, the inclined edge 78 of the spring 74 is lying in the position indicated in dotted lines behind the rear edge 71 of the arm 70 with the top surface of the spring 74 in engagement with the outer side of the arm 70 and spaced from the top side of the arm structure 18, 26. When the arm 82 is tilted under manual control in clockwise direction, the plate 70 will be swung so as to engage its rear edge 71 against the inclined surface 78 whereby the spring 74 will be bent downwardly to engage the top of the portion 26 of the arm 18 whereby the arm 18 will be tilted to lift the tone arm. Provided the tone arm is lifted from its position on the actuating member of the phonograph motor switch, the motor circuit will be closed and the motor will be started to rotate the phonograph turntable. As long as the arm 82 is retained in this position, the tone arm will be lifted and can be swung inwardly by hand to a position in which the stylus tip is vertical above the initial sound groove of the record to be played supported on the turntable, or until the stylus is vertically located above any desired point of the record from which playing is to be started. The tone arm is then in a semi-automatic manner lowered to deposit the stylus in the groove of the record by tilting the lever 82 back to its vertical position.

After the playing of the record the trigger mechanism will as in the case of FIGURE 1 reciprocate the shaft 30 to control lifting of the tone arm and outward movement thereof as described hereinbefore. The manual control mechanism is also designed to cause rejection of the record before the automatic control is governed by the movement of the tone arm stylus in the outlet groove of the record. If in FIGURE 4 the manual control lever 82 is swung counter-clockwise, the arm 70 will be swung clockwise and an edge 88 will come into engagement with the extension 39 of the trigger lever 38 so as to swing the trigger structure to its operative position in engagement with the nose 42 on the turntable spindle.

In the embodiment according to FIGURE 4 suitable means (not shown) may be provided to secure the arm 70 in its neutral position, such as for example in the form of a spring. Preferably this spring is so weak that it cannot overcome the friction between the underside of the arm 70 and the top of the cam portion 78 when the arm 70 has been swung to the position causing lifting of the tone arm under manual control so that it is not necessary to hold the knob 80 in this position while simultaneously moving the tone arm inwardly by hand.

It will be appreciated that the invention is not limited to the details shown in the accompanying drawings and described hereinabove, and that further features can be added to a phonograph as described within the scope of the invention.

Thus, for example, the cam member 36 may have more than one turn following the configuration of a spiral so as to enable the turntable to make more than one revolution during the time interval required for movement of the tone arm to its exterior position.

It will also be possible within the scope of the invention to provide a second cam member in a plane above the cam 36 in combination with means causing a tilting of the left hand end of the shaft 30 when the tone arm is in a predetermined exterior position, so as to thereby bring the roller 34 out of engagement with the cam 36 and into engagement with the underside of such second cam member whereby the direction of rotation of the shaft 30 will be reversed and cause the tone arm to be swung inwardly, for example until the arm structure 18, 26 engages an abutment corresponding to a predetermined size of a record. Such abutment may be in the form of a stationary abutment or a selected one of a plurality of abutments selectable by suitable manual control means.

It is also possible within the scope of the invention to provide for a record drop control mechanism by means of a centre spindle having suitable record drop control means incorporated. Thus, for example, an actuating member for a centre spindle of this type may be provided to be moved in a position latched in engagement with the actuating member of the centre spindle in response to the reciprocation of the shaft 30 when the latter is moved under control of the trigger mechanism. A portion of such actuating member may extend under a cam surface located below the cam 36 and designed to actuate the centre spindle when the turntable has made such part of a revolution necessary to bring the tone arm to an exterior position. The actuating member may be designed to be unlatched in response to its actuation and the subsequent movement of the actuating member to its neutral position may be utilised to cause the tilting of the shaft 30 to disengage the cam 36 and engage the second cam causing the inward swinging of the tone arm.

It will be appreciated that still further modifications will be possible within the scope of the invention. Thus, for example, it will be possible to provide the manual control with means facilitating the deposit of the tone arm stylus in the initial sound grooves of records of predetermined sizes. By way of example the spring 74 may have a downwardly extending member, such as a knife or the like, capable of engaging in indexing notches in the top surface of the arm portion 26. By locating such indexing notches in proper spaced relationship, they will be able to determine the location of the tone arm with its stylus vertically above the initial sound grooves of records of a number of predetermined sizes.

It will be understood that the latching of such knife member in such indexing grooves should be easily tiltable so as to allow the tone arm to be swung by hand passing each indexing position without any substantial obstruction.

It will also be understood that a structure, which by means of the swinging movement of the tone arm can be reversed, may include using a duplex roller system at the end of the shaft 30 instead of the single roller 32. Such duplex rollers will rotate in opposed directions and can be mounted on a tiltable member which is caused to tilt when the tone arm has been swung to a predetermined exterior position so as to disengage one of the duplex rollers from the surface 26 and bring the other roller into engagement therewith.

I claim:

1. In a phonograph having a power driven turntable and a tone arm including stylus means in combination: a tone arm structure including an arm extending below the tone arm, means connecting said arm and said tone arm for swinging said tone arm together with said arm, means supporting said arm for tilting movement in a direction substantially perpendicular to its direction of swinging, means operable to raise the tone arm in response to tilting of said arm in one direction, means supporting said tone arm structure for swinging movement, a trigger mechanism having a member reciprocable in response to termination of playing of a record, an elongated spindle extending between adjacent said turntable spindle and the end of said tiltable arm which is remote from its pivot point, means for reciprocating said elongated spindle in response to the reciprocation of said trigger mechanism member, cam means operable in response to reciprocation of said spindle to tilt said arm whereby said spindle is brought into engagement with the surface of said arm, means for retaining said spindle in said reciprocated position, means for rotating said spindle in said reciprocated position to cause swinging of said tone arm structure by the engagement between said spindle and said arm surface, the surface of said arm having an extension transverse to its direction of tilting sufficiently to retain said arm in tilted position during the swinging movement of said tone arm to a predetermined exterior position.

2. In a phonograph having a power driven turntable and a tone arm including stylus means in combination: a tone arm structure including an arm extending below the tone arm, means connecting said arm and said tone arm for swinging said tone arm together with said arm, means supporting said arm for tilting movement in a direction substantially perpendicular to its direction of swinging, means operable to raise the tone arm in response to tilting of said arm in one direction, means supporting said tone arm structure for swinging movement, a trigger mechanism having a member reciprocable in response to termination of playing of a record, an elongated spindle extending between adjacent said turntable spindle and that end of said tiltable arm which is remote from its pivot point, means for reciprocating said elongated spindle in response to the reciprocation of said trigger mechanism member, a member on that end of said spindle adjacent said tiltable arm for engaging and tilting said arm in response to said reciprocation of said spindle, means for retaining said spindle in said reciprocated position, means for rotating said spindle in said reciprocated position, said tiltable arm having a portion extending transversely to its direction of tilting sufficiently to retain said arm in tilted position during the swinging movement of said tone arm to a predetermined exterior position as caused by rotation of said spindle with said member in engagement with said arm portion.

3. In a phonograph having a power driven turntable and a tone arm including stylus means for playing a record supported on said turntable, a member, means for mounting said last-mentioned member for tilting as well as swinging movement, means connecting said tiltable and swingingly arranged member with said tone arm for causing said tone arm to swing together with said member, means operable to raise the tone arm in response to tilting of said member in one direction, means for tilting said member in said direction to raise the tone arm in response to termination of playing of a record, an elongated shaft mounted for rotation, means for reciprocating said shaft to an operative position in response to termination of playing of a record, latch means for holding said shaft in said reciprocated position, a cam member rotating with said turntable for driving said shaft, a driving member on said shaft in frictional engagement with said tiltable member in said operative position for swinging the tone arm outwards in response to rotation of said shaft, and means for unlatching said rotatable shaft in a predetermined exterior position of said tone arm.

4. In a phonograph having a power driven turntable and a tone arm including stylus means: an arm, means for mounting said arm to enable tilting as well as swinging movement, means operable to raise the tone arm in response to tilting of said arm about a predetermined tilting axis, means operable to swing the tone arm in response to swinging of said arm, a trigger mechanism having a reciprocable member operable after playing of a record, means operable in response to the reciprocation of said member to tilt said arm to raise the tone arm, and means operable to retain said arm in such tilted position during swinging of the tone arm between an interior after-play position and an exterior stop position.

5. A phonograph as claimed in claim 4 including means for swinging said tiltable arm in its tilted position to move the tone arm outwards.

6. A phonograph as claimed in claim 5, in which said means is in the form of a reciprocable shaft having a driven end and a driving end portion in frictional engagement with the surface of said tilted arm, and in which further driving means are provided for driving said driven end of said shaft in a reciprocated position thereof.

7. A phonograph as claimed in claim 6, in which said driving means is in the form of a cam surface rotating with the turntable.

8. A phonograph as claimed in claim 6, including means for reciprocating said shaft by the operation of a member of said trigger mechanism.

9. A phonograph as claimed in claim 7, in which said cam surface is of substantially circular configuration along a part of its length.

10. A phonograph as claimed in claim 9, in which said cam surface has an eccentrically extending end portion.

11. In a phonograph having a power driven turntable and a tone arm including stylus means: an arm, means for mounting said arm to enable tilting as well as swinging movement, means operable to raise the tone arm in response to tilting of said arm, means operatively connecting said arm with said tone arm to swing said tone arm in response to swinging of said arm, a trigger mechanism having a reciprocable member operable only after playing of a record, means operable in response to the reciprocation of said member to tilt said arm to raise the tone arm, and a spring member operable to be tightened in response to the operation of said trigger mechanism and engageable with a member connected with said tone arm for producing the swinging movement of said tone arm.

12. A phonograph as claimed in claim 11, in which said spring member is connected with an arm mounted for movement in response to the operation of said trigger mechanism between an inoperative position and an operative position, said arm supporting a member operable to tilt said tiltable arm, and latch means for latching said arm in its operative position.

13. A phonograph as claimed in claim 12, in which a roller is supported for free rotation on said movable arm extending therebelow to engage with the surface of said tiltable arm in its tilted position to provide a light-friction member allowing free swinging of said tiltable arm and thereby said tone arm under the influence of said tightened spring member.

14. In a phonograph having a tone arm: a tone arm raising mechanism including a tiltably mounted arm tiltable about a fixed axis, means operatively connecting said arm with the tone arm for swinging therewith in a direction essentially perpendicular to its direction of tilting, means for raising the tone arm in response to tilting of said arm, control means including engaging means for engaging said arm to thereby tilt said arm, said arm having a portion extending in the direction of said swinging movement and of such dimension as to be retained in engagement with the engaging means of said control means in the tilted position of said arm during swinging movement of the tone arm between its position after playing of the record to start-of-play position.

15. A phonograph as claimed in claim 14, comprising means operable at will for tilting said arm to raise the tone arm to a position allowing swinging of the tone arm by hand to assume a position corresponding to start of play of a record, said means operable at will also being operable to release the tilting of said arm to lower the tone arm to engage its stylus with the surface of a record.

16. A phonograph as claimed in claim 15 including indexing means for the position of the tone arm corresponding to start of play of records of different sizes.

17. A phonograph as claimed in claim 15, in which said means operable by hand includes a member movable between a first inoperative position and a second operative position, and means for tilting said tiltable arm to raise the tone arm in response to the movement of said member to said operative position.

18. A phonograph as claimed in claim 17, in which means for tilting said arm is in the form of a spring, and in which cam means is provided for bending said spring in response to the movement of said member to its operative position.

19. A control arrangement for a phonograph having a tone arm adapted to swing about a relatively fixed axis and adapted to be raised and lowered, comprising a relatively stationary part, means rotatably supporting said tone arm to swing about said axis relative to said stationary part, a tiltable control member having an exposed engaging portion, means operatively connecting said tiltable member with said tone arm to swing the latter during swinging movement of the former and to selectively raise said tone arm during tilting movement of said tiltable member, and means including a control member adapted to engage with the engaging portion of said tiltable member to selectively tilt the same and thereby raise said tone arm, said engaging portion being of such extent and dimension in the direction of said swinging movement that said control member is adapted to remain in engagement therewith in any one of the positions of said tone arm between the end-of-play position thereof and the start-of-play position thereof.

20. A control arrangement for a phonograph having a tone arm adapted to swing about a relatively fixed axis and adapted to be raised and lowered, comprising a relatively stationary part, means rotatably supporting said tone arm to swing about said axis relative to said stationary part, a tiltable control member having an exposed engaging portion, means operatively connecting said tiltable member with said tone arm to swing the latter during swinging movement of the former and to selectively raise said tone arm during tilting movement of said tiltable member, and reciprocable and rotatable control means adapted to engage with the engaging portion of said tiltable member to selectively tilt the same by the reciprocating movement thereof and thereby raise said tone arm and to selectively swing the same by the rotary movement thereof, said engaging portion being of such extent and dimension in the direction of said swinging movement that said control member is adapted to remain in engagement with any one of the positions of said tone arm between the end-of-play position thereof and the start-of-play position thereof.

References Cited in the file of this patent

UNITED STATES PATENTS

| | | |
|---|---|---|
| 2,305,086 | Johnson | Dec. 15, 1942 |
| 2,494,063 | Simon | Jan. 10, 1950 |
| 2,919,923 | Blain | Jan. 5, 1960 |